United States Patent
Marchegiani et al.

(10) Patent No.: US 11,128,141 B2
(45) Date of Patent: Sep. 21, 2021

(54) CONTROL SYSTEM FOR MICROGRIDS FOR THE PRODUCTION AND DISTRIBUTION OF ELECTRIC POWER COMING FROM MULTIPLE PRODUCTION SOURCES OF DIFFERENT TYPES, AND CONTROL METHOD THEREOF

(71) Applicant: Electro Power Systems Manufacturing S.r.l., Milan (IT)

(72) Inventors: Gabriele Marchegiani, Sesto San Giovanni (IT); Luisa Frosio, Brescia (IT); Daniele Rosati, Trecate (IT); Claudio Rosati, Milan (IT)

(73) Assignee: Electro Power Systems Manufacturing S.r.l., Milan (IT)

( * ) Notice: Subject to any disclaimer, the term of this patent is extended or adjusted under 35 U.S.C. 154(b) by 3 days.

(21) Appl. No.: 16/474,580

(22) PCT Filed: Dec. 27, 2017

(86) PCT No.: PCT/IB2017/058409
§ 371 (c)(1),
(2) Date: Jun. 28, 2019

(87) PCT Pub. No.: WO2018/122726
PCT Pub. Date: Jul. 5, 2018

(65) Prior Publication Data
US 2019/0341781 A1 Nov. 7, 2019

(30) Foreign Application Priority Data
Dec. 28, 2016 (IT) .................. 102016000131878

(51) Int. Cl.
*H02J 3/38* (2006.01)
*H02J 3/28* (2006.01)
*H02J 3/46* (2006.01)

(52) U.S. Cl.
CPC ............... *H02J 3/382* (2013.01); *H02J 3/28* (2013.01); *H02J 3/38* (2013.01); *H02J 3/381* (2013.01); *H02J 3/46* (2013.01)

(58) Field of Classification Search
CPC ...... H02J 3/28; H02J 3/38; H02J 3/381; H02J 3/382; H02J 3/46
(Continued)

(56) References Cited

U.S. PATENT DOCUMENTS

| 2004/0051387 A1 | 3/2004 | Lasseter et al. |
| 2011/0248569 A1 | 10/2011 | Son et al. |
| 2016/0363949 A1* | 12/2016 | Zimmanck ............. H02M 3/04 |

FOREIGN PATENT DOCUMENTS

| WO | WO 2015/164292 | 10/2015 |
| WO | WO 2018/122726 | 7/2018 |

OTHER PUBLICATIONS

International Search Report and the Written Opinion dated Mar. 22, 2018 From the International Searching Authority Re. Application No. PCT/IB2017/058409. (11 Pages).
(Continued)

*Primary Examiner* — Hal Kaplan

(57) ABSTRACT

It is described a control system for a microgrid for the production and distribution of electric power coming from multiple electric power sources of the intermittent and/or random and/or programmable and/or accumulation-system type,
said microgrid control system being organized with a hierarchical control structure on two levels, comprising a first control level for power conversion systems (PCS) of electric power coming from said multiple electric power sources, a second control level for a microgrid controller (MC) adapted to cooperate with
(Continued)

said first control level, said second control level being adapted to control electric power to be supplied to a distribution network (on-grid condition) and/or to be supplied as the primary generation to power up isolated loads (off-grid condition) and/or to control intelligent distributed electric power accumulation systems (ACC), said second control level for the microgrid controller (MC) comprising:

a monitoring system (MON), adapted to interface with physical signals generated by said control system, and to perform operations on said power conversion systems (PCS) and on said microgrid;

a control function (FC) system, adapted to receive, at the inputs, measurements and states of the control system and to provide, at the output, parameters and set points through which said monitoring system (MON) acts on said power conversion systems (PCS), so as to manage the power flows of the microgrid;

a state machine (MAS), adapted to cooperate with said monitoring system (MON) and said control functions (FC), so as to control the operating conditions of the microgrid and decide, based on said conditions, which control functions (FC) are to be enabled;

said first control level (CPCS) of power conversion systems (PCS) being adapted to control the values of voltage (V), frequency (f), active power (P) and reactive power (Q) generated by said microgrid, and comprising:

a droop control system under said on-grid condition, adapted to act on the values of said active and reactive power ($P_0$ and $Q_0$), keeping them at set-point values ($P_{ref}$ and $Q_{ref}$), by increasing or decreasing frequency and voltage, respectively, based on first droop curves;

a droop control system under said off-grid condition, adapted to act on the values of said voltage (V) and frequency (f), keeping them at set-point values ($f_{ref}$ and $V_{ref}$), based on second droop curves.

10 Claims, 7 Drawing Sheets

(58) Field of Classification Search
USPC .......................................................... 307/80
See application file for complete search history.

(56) References Cited

OTHER PUBLICATIONS

Rapporto di Ricerca e Opinione Scritta [Search Report and Written Opinion] dated Jul. 18, 2017 From the Ministero dello Sviluppo Economico, Direzione Generale Sviluppo Produttivo e Competitivita Uffico Italiano Brevetti e Marchi Re. Application No. IT201600131878. (8 Pages).

* cited by examiner

CONTROL SYSTEM FOR MICROGRIDS FOR THE PRODUCTION AND DISTRIBUTION OF ELECTRIC POWER COMING FROM MULTIPLE PRODUCTION SOURCES OF DIFFERENT TYPES, AND CONTROL METHOD THEREOF

RELATED APPLICATIONS

This application is a National Phase of PCT Patent Application No. PCT/IB2017/058409 having International filing date of Dec. 27, 2017, which claims the benefit of priority of Italian Patent Application No. 102016000131878 filed on Dec. 28, 2016. The contents of the above applications are all incorporated by reference as if fully set forth herein in their entirety.

FIELD AND BACKGROUND OF THE INVENTION

The present invention relates to a control system for microgrids for the production and distribution of electric power coming from multiple production sources of different types, whether connected to a distribution network or isolated, and to a control method thereof.

The main technical problem that is addressed and solved by the present invention is the control of microgrids for the production and distribution of electric power, comprising systems for generating electric power coming from multiple production sources of different types, such as random renewable sources, fuel-operated generator systems (diesel generator sets) and accumulation systems, whether isolated or connected to distribution networks (which may be subject to interruptions, black-outs and stability problems) and comprising existing components (usually fuel-operated generators) and new components (usually the renewable energy generators, the accumulation system and the grid controller).

A distribution network may not be able to act as a balance node, e.g. during an interruption or if it is particularly weak (low short-circuit power).

The balance node is a node of an electric network that balances the active and reactive power absorbed and generated in the network. In a balance node, voltage (V) and frequency (f) are impressed, whereas power and current depend on the instantaneous power and current values in the various branches of the network. Any active and reactive power unbalance in the network will translate into variations in frequency and voltage from their nominal value.

In order to preserve the stability of the system, it is therefore necessary that the active and reactive power generated or absorbed in the balance node are controlled in an accurate and rapid manner to adjust the frequency and voltage in the network.

Renewable energy generators cannot ensure control over their output power because they follow the uncertainty of the primary source. Fuel-operated generators can partially compensate for power variations of renewable energy generators and loads, but they are subject to several limitations: they cannot absorb power, their response times are generally slow compared to the frequency and voltage adjustment dynamics, and technical limits exist as to the output power adjustment range (minimum operating power, maximum overload, . . . ). Accumulation systems are integrated into microgrids of this kind with two possible functions:

acting as a positive or negative adjustable load to compensate for power fluctuations due to the renewable sources and the load.

acting as a balance node, instantaneously maintaining the grid power balance and adjusting frequency and voltage.

The microgrid controller is used for handling the power flows and ensuring stability of the system: it measures the electric quantities at various points of the grid, receives information about the state of the various connected devices, and establishes the power set points of the generators and of the accumulation system. Devices such as rotary generators and inverters, when controlled in suitable modes, are provided with droop (which will be defined hereinafter) and can act as balance nodes in parallel to other balance nodes.

The possibility of using multiple balance nodes allows:

having a flexible configuration, so that some components can be put out of service or be subjected to operating limitations without jeopardizing the stability of the network;
reducing the size of the components acting as balance nodes because, de facto, the peak power and energy reserve requirements are divided among the various active balance nodes;
increasing the safety of the network because, in the event of a fault in a component acting as a balance node, the same function can be carried out by other systems.

Microgrid control systems are known in the art. The known system that has the most advanced features is the one with the so-called Hierarchical configuration, as described, for example, in the article by J.C. Vasques et al. "Hierarchical Control of Intelligent Microgrids", December 2010, IEEE Industrial Electronic Magazine, pages 23-29, which is characterized by:

Multiple balance nodes, comprising multiple inverters in droop configuration and diesel generators. In droop control mode, which is per se known, the inverters are controlled at impressed voltage according to linear relationships between voltage-reactive power (V-Q) and frequency-active power (f-P). The inverters controlled in droop mode act as balance nodes, modulate the output voltage and frequency as a function of the reactive and active power to be supplied, and respond instantly to power variations imposed by the network (load steps, generators switched off, power fluctuations, etc.);
Microgrid controller that defines power and start/stop set points for the units not acting as balance nodes;
The result is a microgrid with multiple balance nodes, which reflects the known adjustment structure of the most advanced distribution networks with frequency and voltage adjustment.

In order to implement the Hierarchical configuration, the components acting as balance nodes (inverters and, sometimes, generators) are designed to have compatible adjustment characteristics (dynamics and droop), so as to obtain the design division of the adjusting power. A fundamental part of the grid is also the communication network between the main components of the microgrid and the microgrid controller, which defines the set points and start/stop parameters of the various units.

The above-mentioned known Hierarchical configuration operates correctly when all the adjusting components have control characteristics specially built to work in the microgrid, or at least known at the design stage. This configuration cannot be adapted, however, to the case wherein the microgrid has to be built starting from one or more already installed generation systems, which may have one or more of the following limitations:

unknown and non-modifiable adjustment characteristics (droops and dynamics);

operating mode limitations (can only work in islanded configuration or in network parallel configuration);

no possibility to communicate with the microgrid controller.

SUMMARY OF THE INVENTION

It is therefore the object of the present invention to propose a control system for microgrids for the production and distribution of electric power coming from multiple production sources of different types, whether connected to a distribution network or isolated, and to a control method thereof.

The present invention relates to a microgrid control system for the production and distribution of electric power coming from multiple production sources of different types, which has the following main features:

The control system is of the integrated and multi-level type, and comprises the microgrid controller and the controllers of the power conversion systems dedicated to each power source and each accumulation system.

The Power Conversion System Controllers have different operating modes that can be enabled or disabled from the outside;

all the adjustment quantities (droops, dynamics, etc.) are parameterized and adjustable from the outside;

contain software programs implementing algorithms that control the transitions between the different operating modes without any abrupt transients that might lead to network instability. It is thus possible to change dynamically the role of the different generators and accumulation systems connected in the network, from single node to balance nodes in parallel to other balance nodes or to active or passive load.

The Microgrid Controller contains software programs implementing load prediction algorithms;

contains software programs implementing algorithms for predicting the producibility of renewable sources based on local measurements and/or external information;

calculates the "up spinning reserve" and the "down spinning reserve" required to ensure stability of the microgrid at all times.

The term "up spinning reserve" refers to the active power instantly available in the grid to maintain the balance between generation and load following a fast increase in the required power (e.g. load step, switching off or power variation of a generator, . . . ). The "up spinning reserve" is normally calculated as the difference between the maximum power of the generators and accumulation systems connected and activated (maximum power instantly available without any activation and synchronization delays) and the load power (generation power that is present in the microgrid but is "reserved" for supplying the load).

The term "down spinning reserve" refers to the active power instantly available in the microgrid to maintain the balance between generation and load following a fast decrease in the required power (e.g. load reduction, open line, . . . ). The "down spinning reserve" is normally calculated as the difference between the minimum power of the generators and accumulation systems connected and activated (minimum power, even negative, that can be reached instantly without any delays due, for example, to minimum off times of the generators) and the power of the generators and accumulation systems currently used to supply the load.

contains software programs that make calculations in order to define the set point of the various power stations and which units must be turned on or off (dispatch calculations, primary, secondary and tertiary frequency adjustments, reserve management, power flow optimization). The term "dispatch calculations" refers to the calculations made for defining the production plan of a network, i.e. which generators will be active and the power profile thereof.

transforms the results of the "dispatch calculations" into set points, parameters and commands to be sent exclusively to those components that are able to communicate, in order to attain direct control over the units communicating with the microgrid controller and also indirect control over the output power of the connected unit with which it is not possible to communicate.

The result of the optimization calculations described above is a dynamic allocation of the balance nodes of the microgrid to the most appropriate generators at any given time.

The present invention relates to a control system for a microgrid for the production and distribution of electric power coming from multiple electric power sources of the intermittent and/or random and/or programmable and/or accumulation-system type, said microgrid control system being organized with a hierarchical control structure on two levels, comprising a first control level for power conversion systems of electric power coming from said multiple electric power sources, a second control level for a microgrid controller adapted to cooperate with said first control level, said second control level being adapted to control electric power to be supplied to a distribution network (on-grid condition) and/or to be supplied as the primary generation to power up isolated loads (off-grid condition) and/or to control intelligent distributed electric power accumulation systems, said second control level for the microgrid controller comprising:

a monitoring system, adapted to interface with physical signals generated by said control system, and to perform operations on said power conversion systems and on said microgrid;

a control function system, adapted to receive, at the inputs, measurements and states of the control system and to provide, at the outputs, parameters and set points through which said monitoring system acts upon said power conversion systems, so as to manage the power flows of the microgrid;

a state machine, adapted to cooperate with said monitoring system and said control functions, so as to control the operating conditions of the microgrid and decide, based on said conditions, which control functions are to be enabled;

said first control level of electric power conversion systems being adapted to control the values of voltage, frequency, active power and reactive power generated by electric power conversion systems, and comprising:

a droop control system under said on-grid condition, adapted to act on the values of said active and reactive power, keeping them at set-point values, by increasing or decreasing frequency and voltage, respectively, based on first droop curves;

a droop control system under said off-grid condition, adapted to act on the values of said voltage and frequency, keeping them at set-point values, based on second droop curves.

The present invention also relates to a control method for a microgrid for the production and distribution of electric power coming from multiple electric power sources of the intermittent and/or random and/or programmable and/or accumulation-system type.

The present invention further relates to a microgrid comprising said control system.

It is a particular object of the present invention to provide a control system for microgrids for the production and distribution of electric power coming from multiple electric power sources of different types, whether connected to a distribution network or isolated, and a control method thereof, as well as a microgrid comprising said system, as will be further described in the claims, which are an integral part of the present description.

BRIEF DESCRIPTION OF THE SEVERAL VIEWS OF THE DRAWINGS

Further objects and advantages of the present invention will become apparent from the following detailed description of a preferred embodiment (and variants) thereof referring to the annexed drawings, which are only supplied by way of non-limiting example, wherein.

In the drawings, the same reference numerals and letters identify the same items or components.

DESCRIPTION OF SPECIFIC EMBODIMENTS OF THE INVENTION

The system of the invention allows creating a microgrid substantially capable of operating in two modes:
off-grid, i.e. for supplying loads of the isolated microgrid, or
on-grid, i.e. for integrating renewable systems and providing network services to an advanced distribution network connected to the microgrid.

The microgrid can also make instantaneous transitions between the off-grid and on-grid modes, without generating any voltage dips (shortages, interruptions) at the interconnection point towards the network or the loads.

Figure 1:
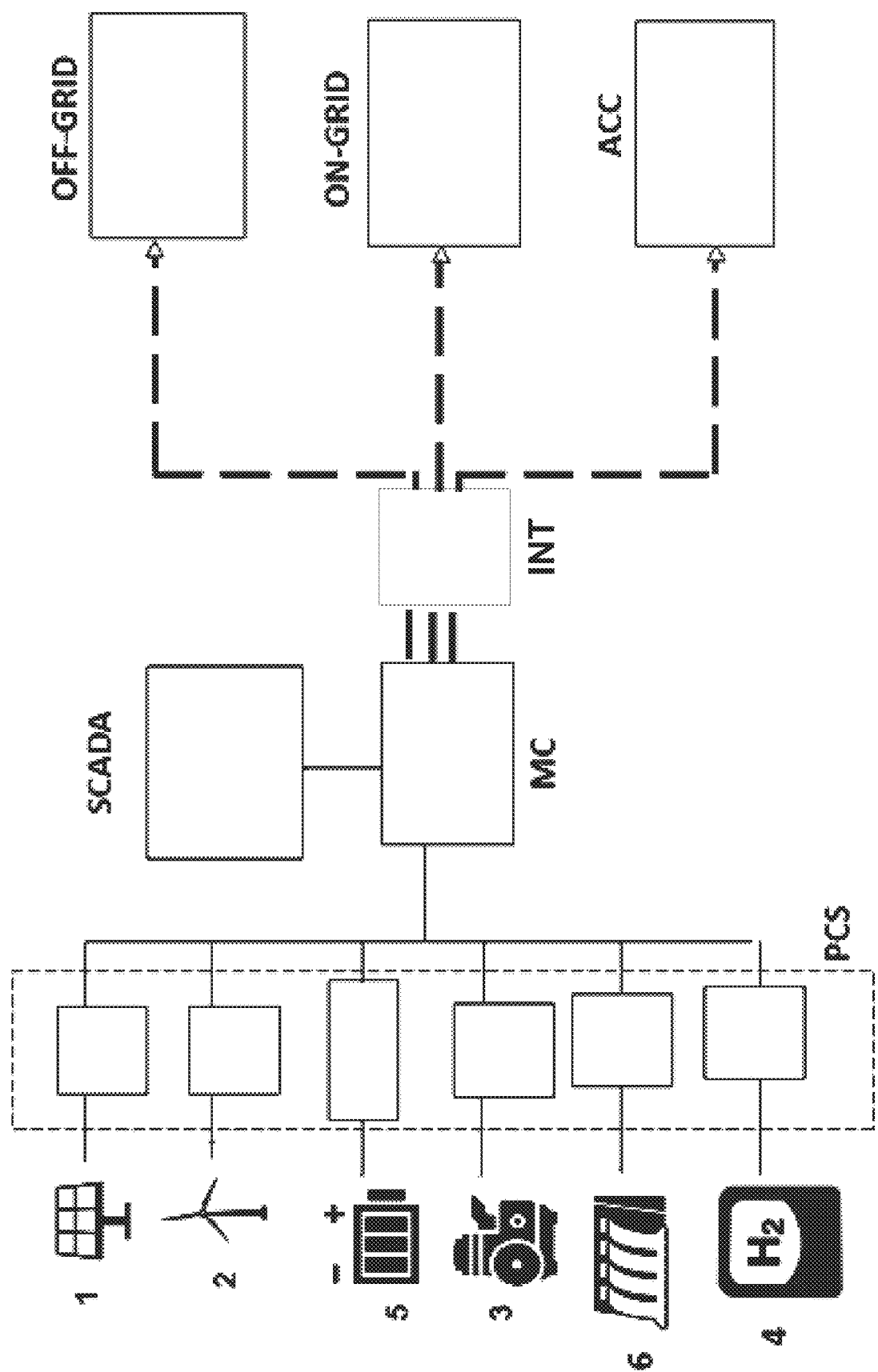
FIG. 1 is a block diagram of the system according to the present invention.

The system of the invention, as shown FIG. 1, comprises conversion and control hardware components (e.g. inverters, PLC controllers, . . . ) of the electric power sources and accumulation systems, and software components implementing algorithms that allow the controllable generation systems and accumulation systems to be managed as one system, which enables the integration of random renewable sources into the microgrids.

In particular, the system inputs comprise electric energy coming from different types of power sources, essentially of the intermittent, random, programmable and accumulation-system type. Some examples are: solar photovoltaic 1, aeolian 2, thermal 3 (diesel engines, gas turbines), hydrogen 4, batteries 5, hydroelectric 6.

The microgrid has a flexible structure, wherein said random, programmable and accumulation-system sources can be coupled via both DC bus and AC bus through suitable DC/AC and DC/DC conversion systems. Existing systems with DC or AC interfaces and systems having different output voltage levels can be integrated into this flexible and modular structure.

The structure of the control system, which provides the modularity required in the microgrid, is of the hierarchical type on at least two levels, as already mentioned above: controllers of power conversion systems (PCS) of power sources and accumulation systems, and a microgrid controller (MC) on a higher hierarchical level.

The Controllers of the Power Conversion Systems PCS have different operating modes that can be enabled or disabled from the outside;
all the adjustments quantities (droops, dynamics, etc.) can be parameterized and adjusted from the outside;
contain software programs implementing algorithms that control the transitions between the different operating modes and the transients caused by variations in the adjustment quantities, without generating abrupt external variations that might lead to network instability.

The Microgrid Controller MC contains software programs implementing load prediction algorithms;
contains software programs implementing algorithms for predicting the producibility of renewable sources based on local measurements and/or external information;
calculates said "up spinning reserve" and "down spinning reserve" as defined above;
contains software programs that make calculations in order to define the set point of the various power stations and which units must be turned on or off (dispatch calculations, primary, secondary and tertiary frequency adjustments, reserve management, power flow optimization). The term "dispatch calculations" refers to the calculations made for defining the production plan of a network, i.e. which generators will be active and the power profile thereof.
transforms the results of the "dispatch calculations" into set points, parameters and commands to be sent exclusively to those components that are able to communicate, in order to attain also indirect control over the output power of the connected units with which it is not possible to communicate.

Furthermore, the microgrid controller MC can interface to a higher control level of a SCADA system, from which it can receive indications about the operating modes required from the microgrid, and to which it can transmit all the relevant quantities of the microgrid.

The microgrid controller MC enables the operation of the microgrid, whether connected to a distribution network (in said on-grid mode) or isolated (in said off-grid mode) or connected to intelligent and distributed accumulation systems (ACC).

A peculiar feature of the system according to the invention is the coordinated use of software programs implementing specific control algorithms for the controllers of power conversion systems PCS ("DROOP" algorithms, as described hereinafter) and for the microgrid controller MC ("OADP" algorithm—optimizer with dynamic priority allocation—as described hereinafter), and the integration thereof into a modular and hierarchical hardware and software structure composed of said controllers of power conversion systems PCS and microgrid controller MC. This integrated use is necessary to enable all the functionalities in the control algorithms and, in particular, said "DROOP" and "OADP" algorithms.

The following paragraphs will describe the characteristics of those elements which are the most important components of the system according to the invention.

1. Microgrid Controller—MC

1.1. Hardware Structure HW of the Microgrid Controller MC

The microgrid controller is a controller based on PLC technology, with a per se known hardware structure, which governs the operating modes of the system components and the power flows in the various branches of the microgrid. In principle, the MC is characterized by:
- modular and flexible architecture, for adapting to the microgrid structure, which usually has a Master-Slave configuration, wherein the Master unit is positioned in proximity to the operator station and the Slave units are positioned at the microgrid subsystems (accumulation subsystem, photovoltaic subsystem, . . . );
- possibility of delocalizing remote 110 units for controlling and monitoring physically separate portions of the system;
- possibility of integrating different types of sensors for monitoring electric and physical quantities (current, voltage, power, temperature, wind speed, irradiation, . . . );
- operator interface (HMI) for controlling and monitoring the system;
- possibility of operating in stand-alone mode or interfacing to higher-level control systems (SCADA).

The component HW of the microgrid controller MC can be implemented in a substantially known manner, e.g. as described in the Italian patent application entitled "Sistema di conversione e controllo per impianti di generazione distribuita" ("Conversion and control system for distributed power generation plants"), filed on 11Apr. 2007, no. MI2007A000729, which is to be considered as an integral part of the present application.

Figure 2:
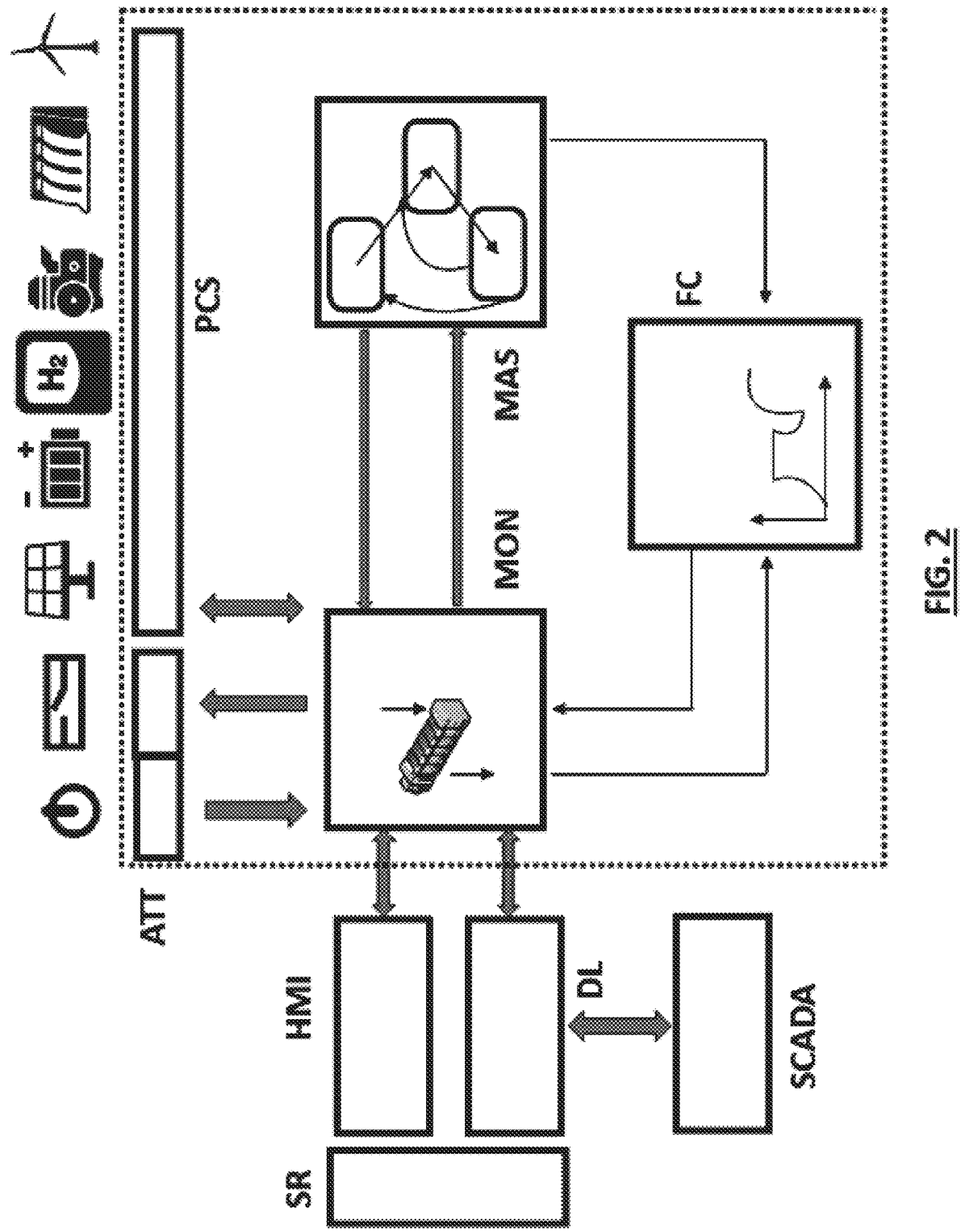
FIG. 2 is a diagram of the macroblocks of the software structure of the microgrid controller MC of the system.

With reference to FIG. 2, the macroblocks of the software structure of the MC will now be described.

1.2. Software Structure SW of the MC

The structure SW is library-based and organized into 3 design macro-areas: monitoring system MON, state machine MAS, control functions FC.

The monitoring system MON receives measurements from the on-site sensors, exchanges data and commands with HMI and SCADA (via data logging DL), and communicates with the actuators ATT (static or electromechanical control devices) and with the subsystems (PCS). A per se known remote supervision system SR may also be included.

The connection among the three macro-areas is effected as follows:
- The monitoring system MON, based on the state of the generators and switches and on the measurements, sends to the state machine MAS the conditions that cause the transitions to either occur or not.
- The state machine MAS returns to the monitoring system MON commands derived from the actions executed in the states.
- The state machine MAS activates and deactivates the control functions necessary for the desired operations, based on the condition of the external variables determined in the monitoring system.
- The control functions FC send to the monitoring system MON the references for the subsystems, and receive feedback to be used as function inputs.

Monitoring system MON: set of program organization units (UOP) that allow the control to interface to the physical signals coming from the system, for the purpose of executing the desired operations on the power conversion systems (PCS) and on the elements that constitute the microgrid. The library created for the monitoring system implements the functions required for handling:
- communication and control towards power conversion systems;
- interface to external Battery Management Systems (BMS);
- remote control of renewable and non-renewable energy generation systems;
- transition conditions for the state machine;
- management and communication of measurement signals;
- conditioning of the signal necessary for the execution of the control functions;
- management of the communication routines of buses and field connections;
- management and communication of set points and control signals;
- data historicization in the data logging;
- communication with the man-machine interface (HMI) and with the remote supervision system;
- alarms and warnings whenever the measurements detect anomalous conditions of other important events.

State machine MAS: this is the UOP unit responsible for handling the operation of the system in normal circumstances according to the microgrid configuration. It controls all the (internal and external) operating conditions of the microgrid and, based on such conditions, decides which control functions should be enabled in order to achieve the management targets.

It is responsible for stopping the system upon a maintenance or stop request from the HMI and for immediately stopping the system whenever an emergency alarm is triggered.

One state machine is defined for each Master or Slave controller in the system.

The state machine is composed of different operating states. A set of actions is associated with each state, to be carried out when the control system causes the plant to operate in that particular state.

The transitions that cause the operation to switch from one state to the next one are defined as program organization units UOP, consisting of a combination of conditions that cause the transition to occur.

The state machine MAS includes the different operating modes of the PCSs, which will be defined hereinafter, and which are activated or deactivated by the MC as a function of the state of the system and of the control algorithm based on which the MAS is structured.

Control functions FC: program organization units UOP responsible for the operation of the subsystems based on the management carried out by the control. The control functions receive, as inputs, measurements and states of the system and provide, as outputs, parameters and set points through which the monitoring system MON acts on the PCSs, the rotary generators and all other actuators so as to manage the power flows in the microgrid, thereby allowing the generators to operate in parallel, if necessary, while ensuring stability and proper operation of the system.

The control functions are parameterized and are handled by an automatic management algorithm (OADP), which executes them according to the assigned priority.

Figure 3:
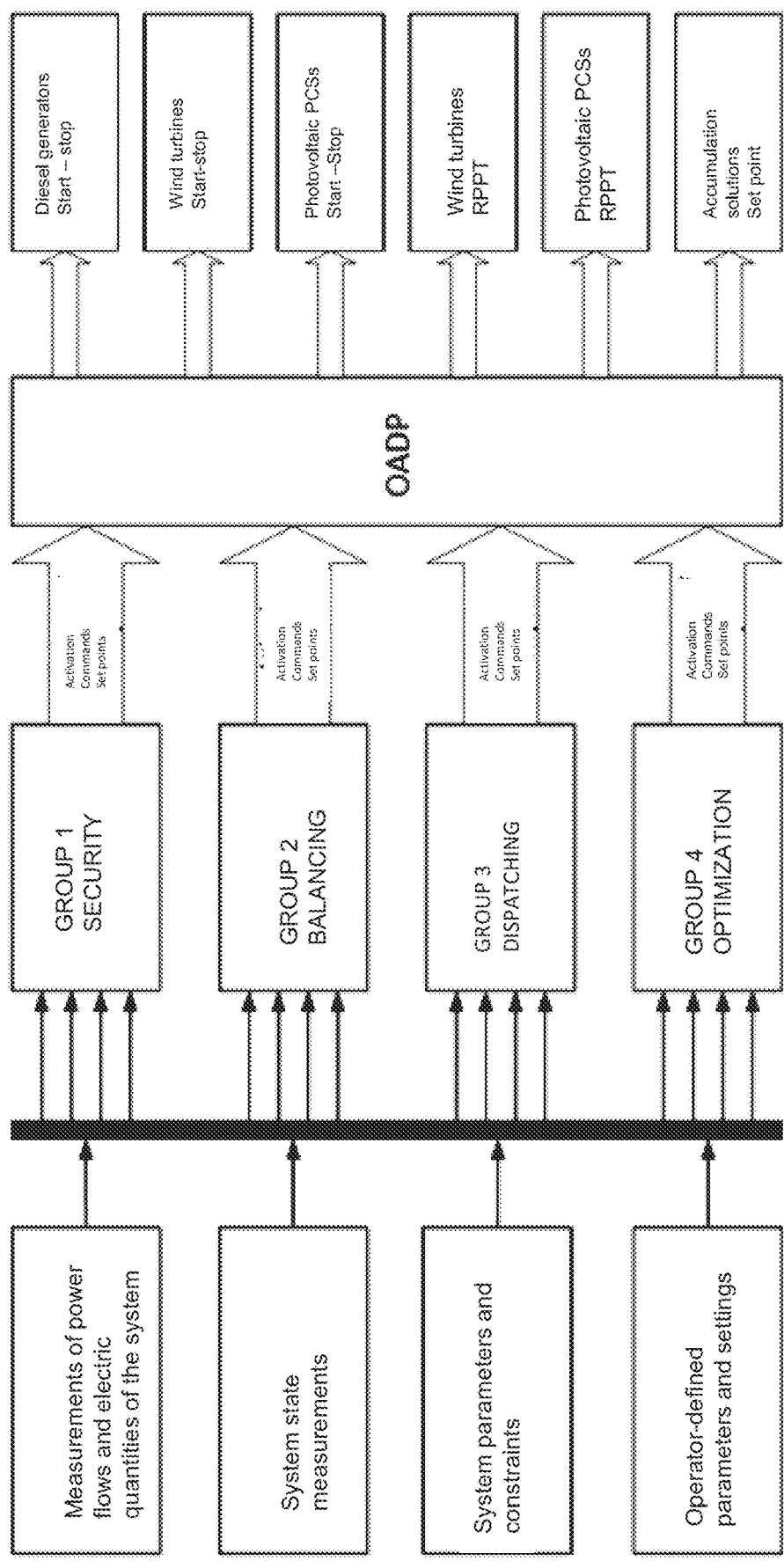
FIG. 3 is a diagram of the macroblocks of the software structure of the algorithm for automatic management (OADP) of the control functions (FC)

Said functions will now be described with reference to FIG. 3.

The functions are divided into groups based on the application they are intended for. The following is a description of the destination groups. Groups are indicated according to the priority order in which they are managed in the OADP.

1) Management of Safety and Proper Operation of the Microgrid Equipment (SAFETY)

In this group, those functions are managed which allow safeguarding the microgrid equipment. For example, this group includes the Pre-Antimotoring (PAM) function.

Pre-Antimotoring (PAM). Generator sets are normally equipped with a protection device that detects the inversion of the power flow from the alternator to the prime mover. Should an inversion occur, the protection device will stop the generator set, trying to avoid any damage to the prime mover of the machine (3, FIG. 1). The Pre-Antimotoring function prevents power flow inversion in the generator set, ensuring at all times a minimum power flow from the generator to the rest of the microgrid. The actions carried out by the PAM function must be executed rapidly and must have the highest priority. The PAM function may also request an immediate stop of the other generator sets connected to the microgrid.

Any function having the necessity of operating in a way similar to the PAM function is allocated to the group of SAFETY functions.

2) Management of the Instantaneous Power Flows of the Microgrid (BALANCING)

In this group, all those functions that ensure proper instantaneous operation of the microgrid are managed, so as to ensure service continuity and power quality in the system. The MC cooperates with the adjustment functions of the individual generators connected to the microgrid. In particular, when PCSs with advanced control algorithms, i.e. DROOP algorithms in this specific case, are connected to the microgrid, the MC implements the Spinning Reserve Management (SRM) functions and the frequency (FPF) and voltage (FQV) primary adjustment functions.

Spinning Reserve Management (SRM). In a microgrid, the Spinning Reserve is the total capacity of instantaneous power unused but available for direct response to power flow variations. In practice, it is the power that is not being used, compared with the nominal power of the generators participating in the microgrid frequency and voltage adjustment. In order to avoid any microgrid power interruptions, it is necessary to maintain, at all times, the spinning reserve level required for reacting to expected power flow variations. Through the SRM function, the microgrid controller MC constantly controls the current total spinning reserve of the microgrid and distributes the power flows so as to ensure the availability of the spinning reserve required by the system, in particular the above-mentioned "up spinning reserve" and "down spinning reserve".

Frequency (FPF) and voltage (FQV) primary adjustment functions. In extensive microgrids, it is advantageous that a larger number of generators than those directly participating in the adjustment participate in the primary adjustment of frequency and voltage. Primary adjustment refers to a power output of the generator that is proportional to the deviation of the control quantity from its reference value. In the frequency adjustment, the generator supplies, or absorbs, if it is a PCS, active power as a function of the difference between the current frequency value and the reference value; in the primary voltage adjustment, it supplies or absorbs reactive power as a function of the difference between the current voltage value and the reference value. In this manner, the control quantities of the microgrid are returned to their reference values, also allowing the power flows to be divided among the various generators. The MC can interact with the generators executing the primary adjustment by changing their parameters, or it may implement the primary adjustment for generators and PCSs that can accept P and Q set points.

Any function having the necessity of operating in a way similar to the above-described functions is allocated to the group of BALANCE functions.

3) Management of the Short-Term Power Flows of the Microgrid (DISPATCHING)

In this group, all those functions are managed which act upon the management of the power flows and production capacity within a short time frame. These functions allow attaining proper operation of the microgrid by managing the available throughput and by applying control actions that are always due to reasons of system functionality. Some of the functions implemented by the MC in this group may be: on/off control of generator sets or other types of generators, management of any specific start-up functions and, possibly, management of curtailment (reduction in output power) of the renewable sources or the load, such as, for example, "peak shaving" functions or "power filtering" functions from very variable sources, e.g. the aeolian source.

4) Mid-Term Management for Optimization and Economical Functions (OPTIMIZATION)

In this group, all those functions are managed which act upon the management of the power flows with the objective of optimizing energetic, economical, life-related and availability-related aspects of the system. This group includes, for example, automatic functions for managing the batteries' state of charge, implemented in accordance with indications provided by the various manufacturers, and functions following set points calculated according to economical optimization functions or optimization functions of a different nature. One example of an optimization function is the "Energy Time Shift" function, through which renewable energy is accumulated in intervals wherein production is in excess, to be then discharged in intervals wherein it will support the other generators.

Each group will generate set points and commands as a function of the system inputs.

The main inputs are:
Measurements of the power flows and electric quantities of the system;
System parameters and constraints;
Operator-defined parameters and settings;
System state measurements (accumulators' state of charge, temperatures, field measurements, . . . ).

Based on the state of the inputs, the software of the OADP algorithm will determine, instant by instant, which function group is "active", handling the priorities thereof as indicated in the above list, wherein a lower number corresponds to higher priority and execution speed. The OADP algorithm will then actuate, on the various subsystems, the set points and commands of the function group in the "active" state that has the highest priority. Basically, therefore, the OADP algorithm executes the set points of the group with the lowest priority, and when a group having higher priority is activated, the algorithm will switch to the set points and commands determined by the active group with higher priority.

The use of libraries containing the basic blocks and the control functions of the SW allows the creation of software SW with a modular structure that can be implemented easily and rapidly. In addition, the transition between software design and software implementation occurs in a schematic manner, by means of diagrams representing the connection between the various blocks contained in the libraries.

2. Controllers of the Power Conversion Systems PCS

2.1. Configurations of the PCS Families

PCSs are used for interfacing power sources and accumulators to the microgrids, and are divided into four families:
- dedicated to bidirectional exchange of DC/AC and AC/DC power with a battery-type accumulation system;
- dedicated to DC/AC power conversion from photovoltaic power stations;
- integrating a DC battery accumulation system, a DC photovoltaic power station, an AC generator set, an AC network, and power supply to an AC load.
- integrating a DC battery accumulation system, an AC aeolian or hydroelectric generator, an AC generator set, an AC network, and power supply to an AC load.

The hardware implementation of said PCSs is substantially known. For example, they can be made in a substantially known manner, e.g. as described in the above-mentioned Italian patent application entitled: "Sistema di conversione e controllo per impianti di generazione distribuita" ("Conversion and control system for distributed power generation plants", filed on 11Apr. 2007, no. MI2007A000729, which is to be considered as an integral part of the present description.

2.2. PCS Operating Mode

All the PCSs of the families presented above comprise a DC/AC inverter interfacing renewable sources and/or batteries to the external AC system (network, loads, microgrid). The PCS panels include the controllers of the DC/DC and DC/AC converters, wherein one or more of the following control algorithms are implemented:

1. Grid following (network parallel—P, Q mode), for DC/AC interface converter
2. Grid forming (network in islanded configuration—V, f mode), for DC/AC interface converter
3. Operation with DC bus voltage control (constant DC bus voltage), for DC/AC interface converter
4. MPPT or RPPT on the PV source, for DC/AC interface converter or for DC/DC converter
5. Pure droop (operation in parallel to a strong or weak network and in islanded configuration), for DC/AC interface converter
6. ONgrid droop (droop control with P,Q adjustment, operation in parallel to a strong or weak network, or in an isolated microgrid), for DC/AC interface converter
7. OFFgrid droop (droop control with V,f adjustment, operation in parallel to a strong or weak network, or in an isolated microgrid), for DC/AC interface converter The possibility of using said different operating modes and of switching from one to another without having to stop the PCSs provides two fundamental elements that, together with the SW structure of the microgrid controller and the modular configuration of both the MC and the PCSs, represent peculiar features of the present invention.

In particular, the innovative aspect of the system described herein is contained in the last two DROOP-type control modes.

Thanks to these three DROOP-type control modes and to the interaction between the PCS controllers and the MC, it is possible to implement the following functionalities within a microgrid.
- Fast ONgrid-OFFgrid transitions, without any interruption in the load supply voltage;
- Connection of islanded microgrids (islanded microgrid clusters);
- Fault management in a microgrid.

The following will describe the seven operating modes of the PCSs, and then the above-described applications will be analyzed.

1. Grid Following

In this operating mode, which is substantially known, the inverter is synchronized with the existing grid and supplies active and reactive power according to given set points ($P_{ref}$ and $Q_{ref}$) through the corresponding PCS controller. The inverter's output frequency and voltage are those of the network to which it is connected.

2. Grid Forming

In this operating mode, which is substantially known, the inverter operates in islanded configuration and is connected to a load that may be either active or passive. The inverter's output voltage and frequency are maintained at a set-point value ($V_{ref}$ and $f_{ref}$) by the corresponding PCS controller. The active and reactive power supplied (or absorbed) by the inverter are defined by the passive (or active) load connected at the output.

3. DC Bus Voltage Control

In this operating mode, which is substantially known, the inverter operates in parallel to the network and the output active power is so adjusted as to maintain the voltage on the DC bus of the inverter at a set-point value ($Vdc_{ref}$). The frequency and voltage output from the inverter are those of the network to which it is connected.

4. MPPT or RPPT

In this operating mode, which is substantially known, e.g. as described in the article by M.S. Carmeli et al, "Advanced control strategy for PQ improvement in PV systems without energy storage device", SPEEDAM 2008 International Symposium on Power Electronics, Electrical Drives, Automation and Motion, pages 217-222, the voltage on the DC bus of the inverter or on the PV side of a DC/DC converter is adjusted in order to extract, from the photovoltaic power station, the maximum available power (MPPT, Maximum Power Point Tracking), or power in an amount equalling a set-point value (RPPT, Requested Power Point Tracking).

Figure 4:
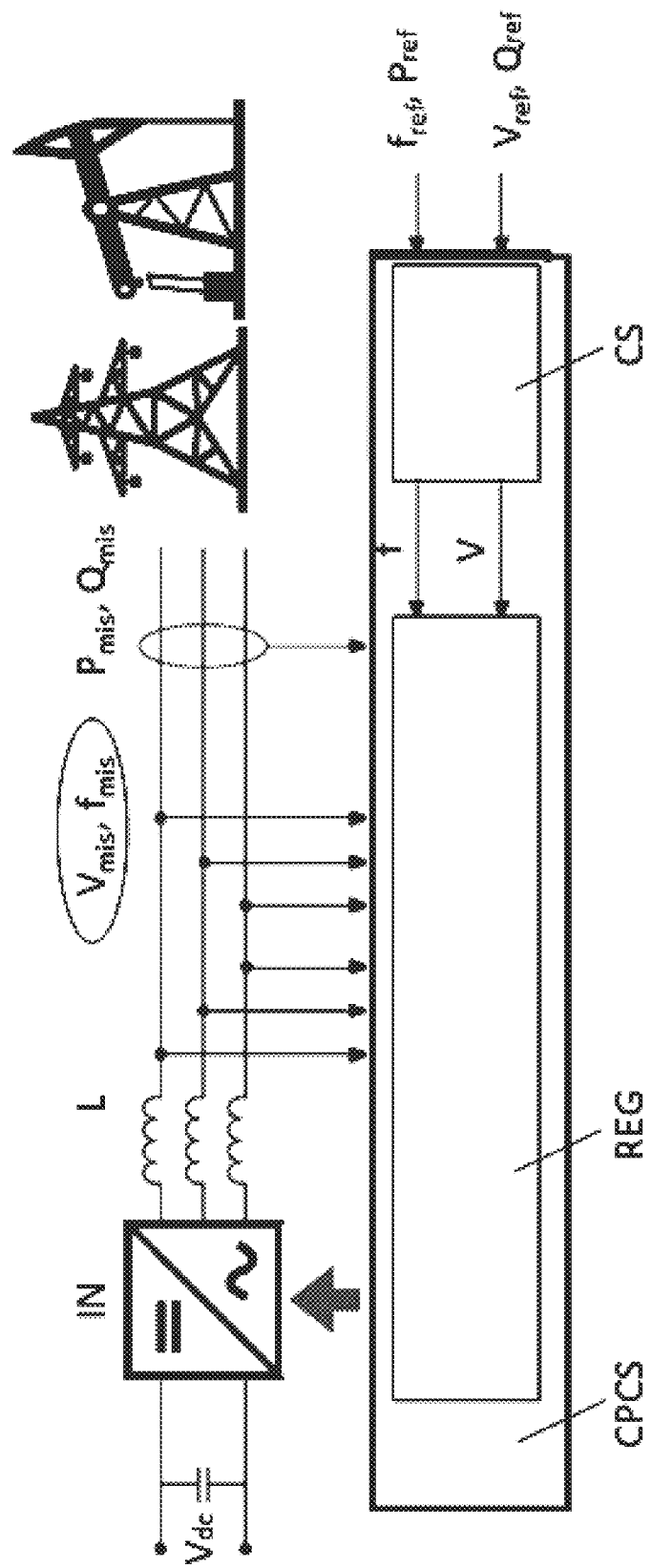
FIG. 4 is a block diagram of an example of a hardware structure of a part of the microgrid, comprising a controller for power conversion systems (PCS) in accordance with the invention.

FIG. 4 shows a general diagram of a PCS in the DROOP modes that will be described below. Inverter devices IN adjust the output voltage and current towards the power distribution network, and are controlled by respective controllers CPCS of the power conversion systems PCS, which generate droop curves CS, which will be described hereinafter, and implement them by means of voltage and frequency regulators (REG).

5. Basic DROOP Control

Figure 5:
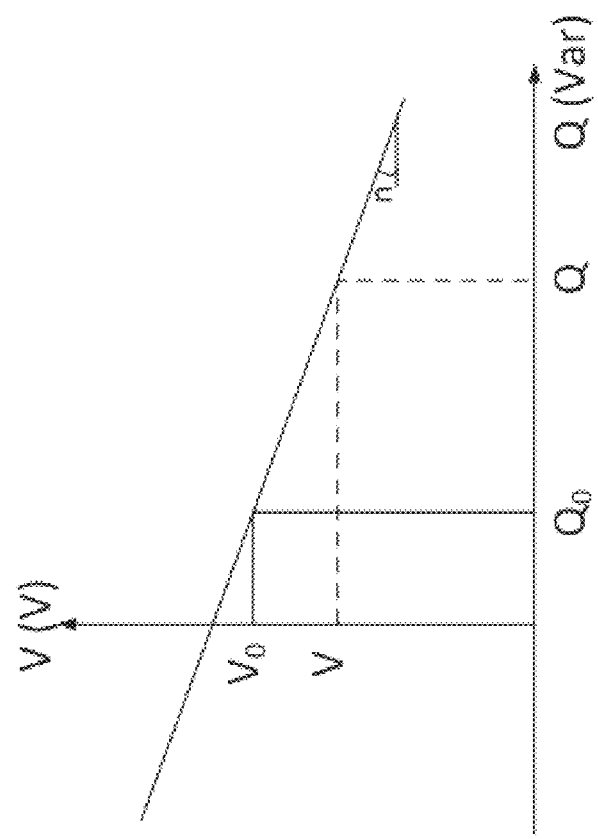
FIGS. 5, 6 and 7 respectively show diagrams of basic, on-grid and off-grid droop control functions.
Figure 5:
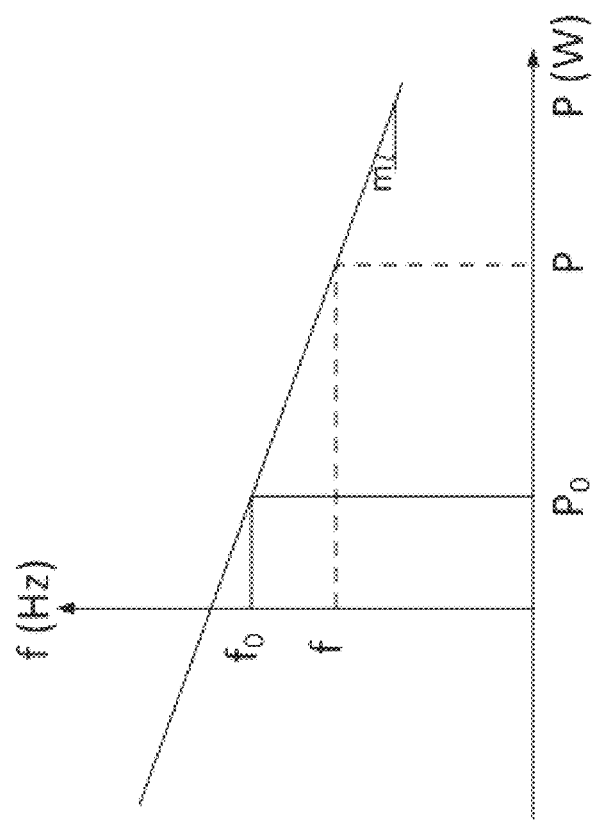

In this operating mode, which is per se known, the output voltage and frequency of the inverter IN are adjusted. Their value, however, does not follow an external set point, as in Grid Forming mode, but is defined as a function of the active power P (for frequency f) and reactive power Q (for voltage V) outputs of the inverter, according to the DROOP curves represented in FIG. 5.

The equations that govern the droop control are:

$$f=f_0-m*(P-P_0)$$

$$V=V_0-n*(Q-Q_0)$$

$f_0$ and $V_0$ are the reference frequency and voltage of the network, $P_0$ and $Q_0$ are the active and reactive power set points, m is the active DROOP coefficient, and n is the reactive DROOP coefficient.

The coefficients m and n, which define the DROOP straight lines, are referred to as "droops", since these are the coefficients that govern the linear relations f-P and V-Q in the DROOP control.

Basic DROOP operation is used both in islanded configuration and in parallel to a strong or weak network. A droop-controlled inverter shows a behaviour similar to that of traditional rotary generators upon fast variations in the frequency (or voltage) of the network it is connected to or in the active (or reactive) power of the load it is connected to. This control mode is used in order to integrate the inverters into systems including other inverters also controlled according to a droop curve or rotary generators, the droop of which is imposed by the automatic speed controller. All inverters operating in DROOP mode and the rotary generators connected to the network or microgrid contribute to the frequency and voltage adjustment by modifying their output power as a function of the voltage V and frequency f variations in the network. The power quota supplied by each generator following a frequency variation depends on its droop: generators having a higher droop (steeper P-f and Q-V curves) will output a greater power contribution. In PCS controllers, the DROOP coefficients can be modified from the outside either manually, by the operator, or automatically, by the MC. The DROOP coefficients of the PCSs are modified as a function of the other generators included in the system, so that the connected inverters will participate in the frequency and voltage adjustment with a quota equal to (or greater or smaller than, depending on the design specifications) the one of the other generators: for example, if two generator sets and two inverters are connected, a possible load step can be covered for 25% by each machine, or for 20% by each DG (diesel generator) and for 30% by each inverter.

6. ONGrid DROOP

Compared to the basic DROOP algorithm, two slower (i.e. executed with a longer period) adjustment loops are added, which respectively act upon the values $P_0$ and $Q_0$, in order to maintain the values of P and Q at the inverter's output ($P_{mis}$ and $Q_{mis}$) at set points $P_{ref}$ and $Q_{ref}$ according to the following algorithm:

If $P_{mis}-P_{ref}<0 \rightarrow$ increase of $f_0$

If $P_{mis}-P_{ref}>0 \rightarrow$ decrease of $f_0$

If $Q_{mis}-Q_{ref}<0 \rightarrow$ increase of $V_0$

If $Q_{mis}-Q_{ref}>0 \rightarrow$ decrease of $V_0$

Figure 6:
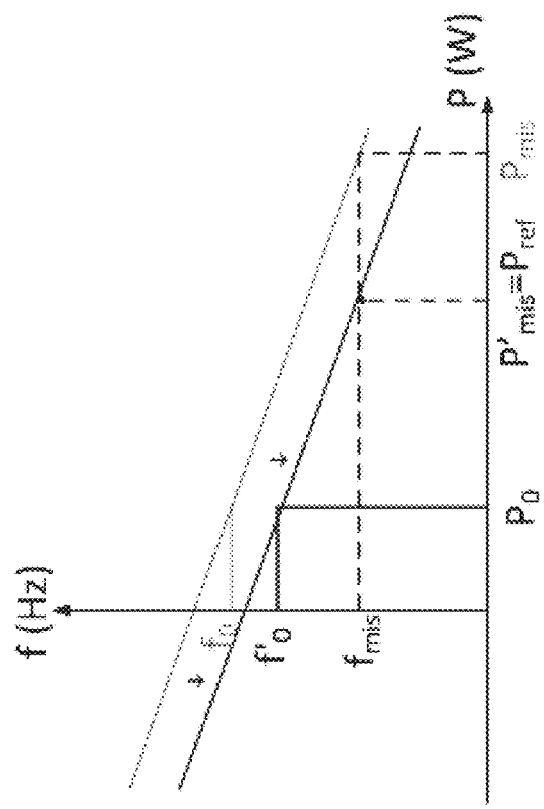
Figure 6:
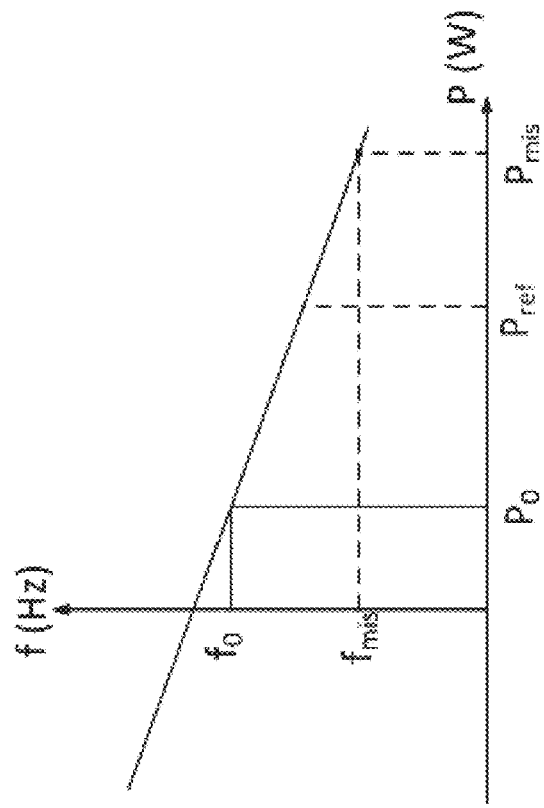

FIG. 6 shows a diagram of the effect of the ONGrid DROOP control on the f-P DROOP curve.

An inverter controlled in ONGrid DROOP mode and operating in parallel to a strong or weak network, where V and f are imposed, will instantly respond to a frequency decrease (or increase) in the network by increasing (or decreasing) the output power, thus contributing to improving the stability of the network by opposing to the frequency variation. This first adjustment occurs in an almost instantaneous manner (a few tens of milliseconds), and is governed by the droop curves. When this first transient ends and the network frequency settles to a new value, lower (or higher) than the previous one, the adjustment loop on $P_0$ will intervene by "moving" the f-P droop curve down (or up) in order to restore the power output value of the inverter to the set-point value $P_{ref}$, while the frequency of the network and of the inverter will remain at the new value taken at the end of the transient.

This control mode is used in order to manage the power flows at the output of the inverter, thereby contributing to the system frequency adjustment, and also, at the same time, in order to exploit its capability of instantly supporting the network or the microgrid when voltage unbalance occurs, thus contributing to the system voltage adjustment by outputting or absorbing reactive power.

7. OFFGrid DROOP

Compared to the basic DROOP algorithm, two slower (i.e. executed with a longer period) adjustment loops are added, which respectively act upon the values $f_0$ and $V_0$, in order to maintain the values of f and V measured at the inverter's output ($f_{mis}$ and $V_{mis}$) at set points $f_{ref}$ and $V_{ref}$ according to the following algorithm:

If $f_{mis}-f_{ref}<0 \rightarrow$ increase of $f_0$

If $f_{mis}-f_{ref}>0 \rightarrow$ decrease of $f_0$

If $V_{mis}-V_{ref}$<0→increase of $V_O$

If $V_{mis}-V_{ref}$>0→decrease of $V_O$

Figure 7:
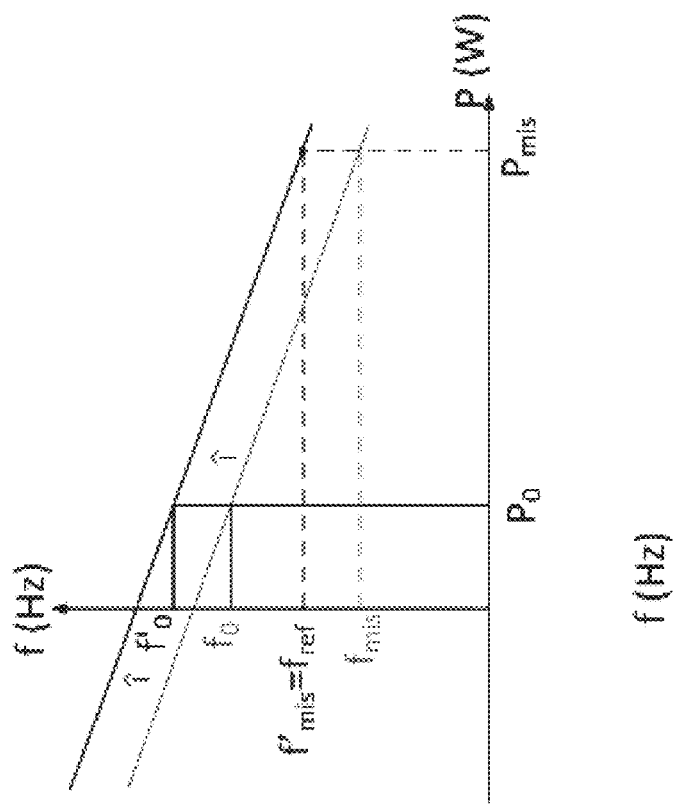
Figure 7:
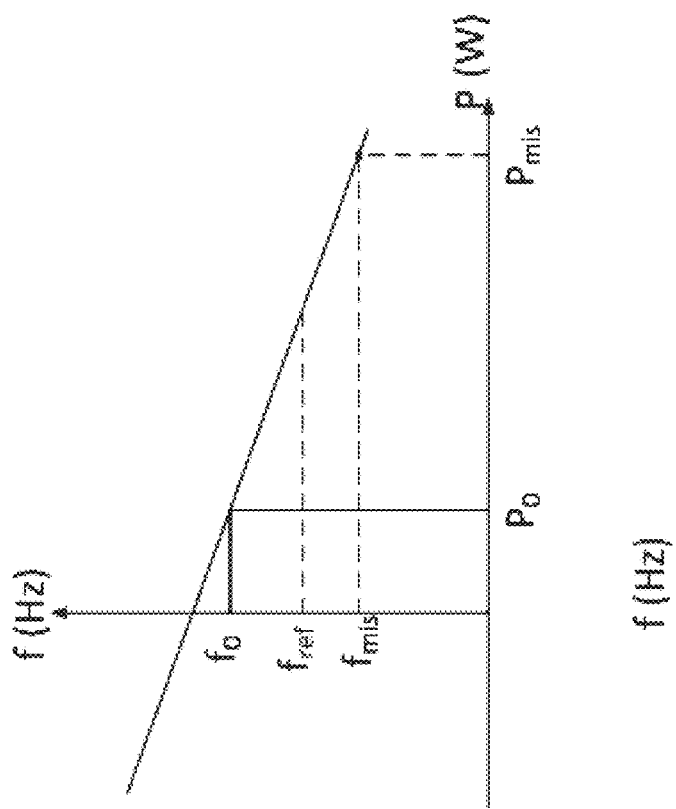

FIG. 7 shows a diagram of the effect of the OFFGrid DROOP control on the f-P DROOP curve.

An inverter controlled in OFFGrid DROOP mode and operating in islanded configuration or in a weak network, where it is the inverter itself that imposes V and f, will respond instantly to a decrease (or an increase) in the active or reactive power required by the network by providing the necessary power variation and increasing (or decreasing) the output V or f. This first adjustment is governed by the DROOP curves. When this first transient ends and the network quantities (voltage and frequency) settle to new values, higher (or lower) than the previous ones, the adjustment loop on $f_O$ and $V_O$ will intervene by "moving" the f-P DROOP curve up (or down) in order to restore the network frequency and voltage to the set-point values, while the inverter's output power values will remain to the new values taken at the end of the transient.

This control mode is used for managing a microgrid in which the inverter imposes voltage and frequency values, but is not the only element with (real or virtual) inertia capable of contributing to any fast variations in the active and reactive power balance in the network. With this type of control, the inverter in OFFGrid DROOP mode allows all droop-enabled generators to participate in the network voltage and frequency adjustment, but it will then regain its role as "Master" and restore the network quantities to their reference values, without further modifying the power flow distribution defined downstream of the transient and governed by the droops of the various connected generators.

In light of the above, it is apparent that in the PCS controllers the same voltage and frequency regulator is maintained during both on-grid operation and off-grid operation. Only the references change (for P and Q in on-grid operation and for V and f in off-grid operation), which come from the microgrid controller. The advantage of this solution is that there is no need for fast communication between the switch that puts the microgrid in islanded configuration and the controllers; on the contrary, even if the PCSs do not receive the signal indicating the switching from off-grid operation to on-grid operation, or vice versa, they will still continue working, outputting power and adjusting voltage and frequency. The stability of the microgrid is thus ensured even in the absence of communication, whether slow or fast, between PCS, MC and the interface switch between microgrid and network. Communication, even slow, is only useful for optimizing the operation of the system, so as to cause power to be produced by the least expensive sources, keep the voltage and frequency values within optimal ranges, etc.

The following will describe some functionalities obtained due to the combined use of the control algorithms available in the PCSs and in the MC controller.

Fast ONgrid-OFFgrid Transitions

In the case of systems connected to weak networks, should an interruption or blackout occur in the network, the microgrid can switch in a very short time (of the order of milliseconds) to islanded operation, continuing to supply its own loads without the latter undergoing any voltage dip, and hence without any interruption in the load supply voltage.

Such a fast transition can occur when the microgrid includes some PCSs connected to accumulation systems and operating in ONGrid DROOP mode. When a network interruption occurs, a static switch arranged between the microgrid and the network will open and the microgrid will go into islanded operation, with a power unbalance due to the sudden stop of the power flow from or to the network. The PCSs in ONGrid DROOP mode, which were following their own power set point, will instantly compensate the power unbalance in the microgrid by stopping the resulting frequency transient, which will take a value other than the nominal one. When the MC detects that switching to islanded operation has occurred, it will assign a PCS the task of adjusting V and f of the microgrid and will send thereto the command to switch to OFFGrid DROOP operation, along with the associated voltage and frequency set points. The PCS in OFFGrid DROOP mode will then restore the voltage and frequency of the microgrid to the nominal values, while the other PCSs in ONGrid DROOP mode will supply or absorb power according to the previous set points or according to new values sent by the MC as a function of the new state of the microgrid.

The transition of the microgrid from islanded operation to network parallel operation occurs in the opposite way. When the MC verifies that the network is available and stable again, it will command the PCS in OFFGrid DROOP mode to switch to ONGrid DROOP operation, with the active and reactive power set points equalling the values being supplied at that very instant. Then it will command the static switch to close and, if necessary, it will modify the P and Q set points for all the PCSs operating in ONGrid DROOP mode.

In one possible, but non-limiting, example of embodiment, for the purpose of ensuring the absence of interruptions in the power supply to the loads, an interface INT (FIG. 1) is included at the output of the MC towards the loads, which comprises a three-socket three-phase inductor, connected to the network, to the load and to the inverters, and one or more interface switches, controlled by the MC without requiring particularly fast communication. The interface may also be located in a remote position. The implementation of this interface is not a problem for the man skilled in the art.

Connection of Islanded Microgrids (Islanded Microgrid Clusters)

Due to the flexibility of a microgrid based on the use of MCs, PCSs and PCS controllers, it is possible to connect multiple microgrids together without resorting to high-speed communication systems among the MCs of the single microgrids. In fact, every microgrid behaves, at the interface terminals, as a single generator in ONGrid DROOP or OFFGrid DROOP mode, and the instantaneous voltage and frequency adjustment in the system made up of the two microgrids is therefore governed by the equivalent DROOP curves of the connected microgrids. The communication between the MCs of the microgrids is useful to restore the set-point values of the power flows, voltages and frequencies of the system as a whole, and therefore there are no particularly stringent requisites in terms of speed and reliability, since system stability is not directly dependent thereon.

Fault Management in a Microgrid

In a microgrid supplied by inverters only, with no rotary generators, there is a risk that the short-circuit current will be too low to allow for selective calibration of the protection devices. Generally, in fact, a single inverter operates in Grid Forming mode and the other inverters operate in Grid Following mode. If a fault occurs, only the inverter in Grid Forming mode will contribute to the short-circuit current, until its own internal protection devices intervene. On the contrary, if a configuration is adopted wherein one PCS is in ONGrid DROOP mode and the other PCSs are in OFFGrid DROOP mode, all PCSs will contribute to the fault current, which will take a higher value and may allow for selective calibration of the protection devices.

The present invention can advantageously be implemented, at least partly, by means of computer programs comprising coding means for carrying out one or more steps of the method, when said programs are executed on a computer. It is therefore understood that the protection scope extends to said computer programs and also to computer-readable means comprising recorded messages, said computer-readable means comprising program coding means for carrying out one or more steps of the method, when said program is executed on a computer.

Among the advantages achieved by the present invention, it must be pointed out that the block MC takes care of managing the entire microgrid, not only the operation of the individual PCSs. The advantage of the approach described by the present invention is that it optimizes the operation of all the power sources of the microgrid, as opposed to the operation of only those sources under specific control, and allows the PCSs to connect in parallel to existing generators in an intelligent manner, supporting them in the management of the microgrid (V and f control).

The above-described non-limiting example of embodiment may be subject to variations without departing from the protection scope of the present invention, including all equivalent designs known to a man skilled in the art.

The elements and features shown in the various preferred embodiments may be combined together without however departing from the protection scope of the present invention.

In light of the above description, the man skilled in the art will be able to produce the object of the invention without introducing any further implementation details. In particular, the software part can be implemented through the use of programming languages that are well known to those skilled in the art, such as, for example, C++ and/or a PLC programming language according to the IEC61131-3 specification.

What is claimed is:

1. A control system for a microgrid for the production and distribution of electric power coming from multiple electric power sources of the intermittent and/or random and/or programmable and/or accumulation-system type,
    said microgrid control system being organized with a hierarchical control structure on two levels, comprising a first control level for power conversion systems (PCS) of electric power coming from said multiple electric power sources, a second control level for a microgrid controller (MC) adapted to cooperate with said first control level, said second control level being adapted to control electric power to be supplied to a distribution network (on-grid condition) and/or to be supplied as the primary generation to power up isolated loads (off-grid condition) and/or to control intelligent distributed electric power accumulation systems (ACC),
    said second control level for the microgrid controller (MC) comprising:
        a monitoring system (MON), adapted to interface with physical signals generated by said control system, and to perform operations on said power conversion systems (PCS) and on said microgrid;
        a control function (FC) system, adapted to receive, at the inputs, measurements and states of the control system and provide, at the output, parameters and set points through which said monitoring system (MON) acts on said power conversion systems (PCS), so as to manage the power flows of the microgrid;
        a state machine (MAS), adapted to cooperate with said monitoring system (MON) and said control functions (FC), so as to control the operating conditions of the microgrid and decide, based on said conditions, which control functions (FC) are to be enabled;
        said first control level (OPCS) of power conversion systems (PCS) being adapted to control the values of voltage (V), frequency (f), active power (P) and reactive power (Q) generated by said microgrid, and comprising:
            a droop control system under said on-grid condition, adapted to act on the values of said active and reactive power ($P_0$ and $Q_0$), keeping them at set-point values ($P_{ref}$ and $Q_{ref}$), by increasing or decreasing frequency and voltage, respectively, based on first droop curves; and
            a droop control system under said off-grid condition, adapted to act on the values of said voltage (V) and frequency (f), keeping them at set-point values ($f_{ref}$ and $V_{ref}$), based on second droop curves.

2. A control system as in claim 1, wherein said control function (FC) system comprises one or more of the following functions:
    Pre-Antimotoring (PAM) function, adapted to prevent power-flow inversion on generator sets in said electric power sources, under conditions of maximum priority, also being capable of determining a quick stop of other generators connected to the microgrid;
    Spinning Reserve Management (SRM) function, adapted to ensure stability of the microgrid at all times, comprising an "up spinning reserve" function, as the active power instantly available in the microgrid to maintain the balance between generation and load following a fast increase in the required power, calculated as the difference between the maximum power of the generators and accumulation systems connected thereto and activated, and the power used to supply the load, and comprising a "down spinning reserve", as the active power instantly available in the microgrid to maintain the balance between generation and load following a fast decrease in the required power, calculated as the difference between the minimum power of the generators and accumulation systems connected thereto and activated, and the power of the generators and accumulation systems currently used to supply the load; and
    frequency primary adjustment function (FPF), according to which a generator supplies or absorbs active power as a function of the deviation of the current frequency value with respect to a reference value, and frequency (FPF) and voltage (FQV) primary adjustment function, according to which a generator supplies or absorbs reactive power as a function of the deviation of the current voltage value with respect to a reference value.

3. A control system as in claim 1, wherein said first control level (OPCS) of power conversion systems (PCS) comprises one or more of the following functions:
    a "grid following" control system, under said on-grid condition, adapted to supply active and reactive power according to given set points ($P_{ref}$ and $Q_{ref}$) through the corresponding power conversion system (PCS), with an output frequency and voltage that are those of the network to which it is connected;

a "grid forming" control system, under said off-grid condition, adapted to maintain the output voltage and frequency at a set-point value ($V_{ref}$ and $f_{ref}$) through the corresponding power conversion system (PCS), the active and reactive power supplied or absorbed being defined by the passive (or active) load connected at the output;

a "DC bus voltage" control system, under conditions of connection of said microgrid in parallel to said public distribution network, adapted to adjust the output active power so as to maintain the voltage at a set-point value ($Vdc_{ref}$), the frequency and voltage output from the microgrid being those of said public distribution network;

an "MPPT or RPPT" control system for controlling the power generation of a photovoltaic power station included in said electric power sources, adapted to adjust the voltage so as to extract, from the photovoltaic power station, the maximum available power (MPPT) or power in an amount equalling a set-point value (RPPT); and a basic droop control system, adapted to adjust said voltage and said frequency, so that their value is defined as a function of the active power P (for frequency f) and the reactive power Q (for voltage V), based on third droop curves.

4. A microgrid for the production and distribution of electric power coming from multiple electric power sources of the intermittent and/or random and/or programmable and/or accumulation-system type, comprising a control system as in claim 1, said microgrid control system being organized with a hierarchical control structure on two levels, comprising a first control level for power conversion systems (PCS) of electric power coming from said multiple electric power sources, a second control level for a microgrid controller (MC) adapted to cooperate with said first control level, said second control level being adapted to control electric power to be supplied to a distribution network (on-grid condition) and/or to be supplied as the primary generation to power up isolated loads (off-grid condition) and/or to control intelligent distributed electric power accumulation systems (ACC).

5. A control method for a microgrid for the production and distribution of electric power coming from multiple electric power sources of the intermittent and/or random and/or programmable and/or accumulation-system type, comprising:

implementing a hierarchical control structure on two levels, comprising a first control level for power conversion systems (PCS) of electric power coming from said multiple electric power sources, a second control level for a microgrid controller (MC) adapted to cooperate with said first control level, adapting said second control level to control electric power to be supplied to a public distribution network (on-grid condition) and/or to be supplied as the primary generation to power up isolated loads (off-grid condition) and/or to control intelligent distributed electric power accumulation systems (ACC), providing said second control level of the microgrid controller (MC) with:

a monitoring system (MON), adapted to interface with physical signals generated by said control system, and to perform operations on said power conversion systems (PCS) and on said microgrid;

control functions (FC), adapted to receive, at the inputs, measurements and states of the control system and to provide, at the output, parameters and set points through which said monitoring system (MON) acts on said power conversion systems (PCS), so as to manage the power flows of the microgrid;

a state machine (MAS), adapted to cooperate with said monitoring system (MON) and said control functions (FC), so as to control the operating conditions of the microgrid and decide, based on said conditions, which control functions (FC) are to be enabled;

adapting said first control level (CPCS) of power conversion systems (PCS) to control the values of voltage (V), frequency (f), active power (P) and reactive power (Q) generated by said microgrid, and:

providing said first control level (CPCS) of power conversion systems (PCS) with:

a droop control under said on-grid condition, adapted to act on the values of said active and reactive power ($P_0$ and $Q_0$), keeping them at set-point values ($P_{ref}$ and $Q_{ref}$), by increasing or decreasing frequency and voltage, respectively, based on first droop curves; and a droop control under said off-grid condition, adapted to act on the values of said voltage (V) and frequency (f), keeping them at set-point values ($f_{ref}$ and $V_{ref}$) based on second droop curves.

6. A control method as in claim 5, wherein said control functions (FC) comprise one or more of the following functions:

Pre-Antimotoring (PAM) function, adapted to prevent power-flow inversion on generator sets in said electric power sources, under conditions of maximum priority, also being capable of determining a quick stop of other generators connected to the microgrid;

Spinning Reserve Management (SRM) function, adapted to ensure stability of the microgrid at all times, comprising an "up spinning reserve" function, as the active power instantly available in the microgrid to maintain the balance between generation and load following a fast increase in the required power, calculated as the difference between the maximum power of the generators and accumulation systems connected thereto and activated, and the power used to supply the load, and comprising a "down spinning reserve", as the active power instantly available in the microgrid to maintain the balance between generation and load following a fast decrease in the required power, calculated as the difference between the minimum power of the generators and accumulation systems connected thereto and activated, and the power of the generators and accumulation systems currently used to supply the load;

frequency primary adjustment function (FPF), according to which a generator supplies or absorbs active power as a function of the deviation of the current frequency value with respect to a reference value, and frequency (FPF) and voltage (FONT) primary adjustment function, according to which a generator supplies or absorbs reactive power as a function of the deviation of the current voltage value with respect to a reference value.

7. A control method as in claim 5, wherein said first control level (CPCS) of power conversion systems (PCS) comprises one or more of the following functions:

"grid following" control, under said on-grid condition, adapted to supply active and reactive power according to given set points ($P_{ref}$ and $Q_{ref}$) rough the corresponding power conversion system (PCS), an output frequency and voltage of the corresponding power conversion system being those of the network to which it is connected;

"grid forming" control, under said off-grid condition, adapted to maintain the output voltage and frequency at a set-point value ($V_{ref}$ and $Q_{ref}$) through the corresponding power conversion system (PCS), the active and reactive power supplied or absorbed being defined by the passive (or active) load connected at the output;

"DC bus voltage" control, under conditions of connection of said microgrid in parallel to said public distribution network, adapted to adjust the output active power so as to maintain the voltage at a set-point value ($Vdc_{ref}$), the frequency and voltage output from the microgrid being those of said public distribution network;

"MPPT or RPPT" control for controlling the power generation of a photovoltaic power station included in said electric power sources, adapted to adjust the voltage so as to extract, from the photovoltaic power station, the maximum available power (MPPT) or power in an amount equalling a set-point value (RPPT), monitoring (MON), adapted to interface with physical signals generated by said control system, and to perform operations on said power conversion systems (PCS) and on said microgrid, based on third droop curves.

8. The control method as in claim 7, wherein said third droop curves perform the following functions:

$f=f_0-m*(P-P_0)$
$V=V_0-n*(Q-Q_0)$ where $f_0$ and $V_0$ are the reference frequency and voltage of the network, $P_0$ and $Q_0$ are the active and reactive power set points, m is an active droop coefficient, and n is the reactive droop coefficient.

9. The control method as in claim 5, wherein said first droop curves perform the following functions:

If $P_{mis}-P_{ref}<0 \rightarrow$ increase of $f_0$
If $P_{mis}-P_{ref}\leq 0 \rightarrow$ decrease of $f_0$
If $Q_{mis}-Q_{ref}<0 \rightarrow$ increase of $V_0$
If $Q_{mis}-Q_{ref}\leq 0 \rightarrow$ decrease of $V_0$ where $f_0$ and $V_0$ are the reference frequency and voltage of the network, $P_{mis}$ and $Q_{mis}$ are active and reactive power values at the output of the microgrid, and $P_{ref}$ and $Q_{ref}$ are said set-point values.

10. The control method as in claim 5, wherein said second droop curves perform the following functions:

If $f_{mis}-f_{ref}<0 \rightarrow$ increase of $f_0$
If $f_{mis}-f_{ref}\leq 0 \rightarrow$ decrease of $f_0$
If $V_{mis}-V_{ref}<0 \rightarrow$ increase of $V_0$
If $V_{mis}-V_{ref}\leq 0 \rightarrow$ decrease of $V_0$ where $f_0$ and $V_0$ are the reference frequency and voltage of the network, $f_{mis}$ and $V_{mis}$ are frequency and voltage values at the output of the microgrid, and $f_{ref}$ and $V_{ref}$ are said set-point values.

* * * * *